US008682080B2

(12) United States Patent
Soutsuka et al.

(10) Patent No.: US 8,682,080 B2
(45) Date of Patent: Mar. 25, 2014

(54) IMAGE PROCESSING APPARATUS, IMAGE PROCESSING METHOD, IMAGE PROCESSING PROGRAM, AND STORAGE MEDIUM

(75) Inventors: Toshiyuki Soutsuka, Kyoto (JP); Tomoki Suruga, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 351 days.

(21) Appl. No.: 13/258,553

(22) PCT Filed: Jan. 25, 2010

(86) PCT No.: PCT/JP2010/050876
§ 371 (c)(1),
(2), (4) Date: Sep. 22, 2011

(87) PCT Pub. No.: WO2010/116774
PCT Pub. Date: Oct. 14, 2010

(65) Prior Publication Data
US 2012/0008874 A1    Jan. 12, 2012

(30) Foreign Application Priority Data

Apr. 7, 2009  (JP) ................................ 2009-093220
Apr. 7, 2009  (JP) ................................ 2009-093222

(51) Int. Cl.
*G06K 9/36* (2006.01)
(52) U.S. Cl.
USPC ............................ 382/199; 382/286; 382/296
(58) Field of Classification Search
USPC ......... 382/154, 199, 296, 294, 288, 276, 286; 359/631, 630, 633
See application file for complete search history.

(56) References Cited

U.S. PATENT DOCUMENTS

| 6,157,737 | A | 12/2000 | Ishikawa et al. | |
|---|---|---|---|---|
| 6,408,105 | B1 | 6/2002 | Maruo | |
| 6,577,763 | B2 * | 6/2003 | Fujimoto et al. | 382/199 |
| 7,406,212 | B2 * | 7/2008 | Mohamed et al. | 382/281 |
| 7,440,636 | B2 * | 10/2008 | Bober et al. | 382/281 |
| 7,706,978 | B2 * | 4/2010 | Schiffmann et al. | 701/301 |
| 7,822,264 | B2 * | 10/2010 | Balslev et al. | 382/154 |

(Continued)

FOREIGN PATENT DOCUMENTS

| JP | 10-283476 A | 10/1998 |
|---|---|---|
| JP | 11-171399 A | 6/1999 |
| JP | 11-328408 A | 11/1999 |
| JP | 2002-084420 A | 3/2002 |
| JP | 2002-228423 A | 8/2002 |

OTHER PUBLICATIONS

Official Communication issued in International Patent Application No. PCT/JP2010/050876, mailed on Feb. 16, 2010.

(Continued)

*Primary Examiner* — Sheela Chawan
(74) *Attorney, Agent, or Firm* — Keating & Bennett, LLP

(57) ABSTRACT

In an image processing apparatus that determines tilt angles of an image, coordinates of points in the image are each transformed into a distance $\rho$ and an angle $\theta$, and votes are cast to a vote table having the distance $\rho$ and the angle $\theta$ as headers. A predetermined number of points having numbers of votes ranked high are extracted from the vote table, and an extraction angle $\theta x$ is determined to achieve maximum consistency with angles $\theta$ at the predetermined number of points, and the tilt angles of the image are determined based on the determined extraction angle $\theta x$.

21 Claims, 15 Drawing Sheets

(56) References Cited

U.S. PATENT DOCUMENTS

| | | | |
|---|---|---|---|
| 7,869,651 B2 * | 1/2011 | Makino | 382/167 |
| 8,226,085 B2 * | 7/2012 | Bontempo et al. | 273/142 H |
| 8,326,085 B2 * | 12/2012 | Yokoi | 382/289 |
| 8,477,390 B2 * | 7/2013 | Iwayama | 358/488 |
| 2002/0028027 A1 | 3/2002 | Koyama | |

OTHER PUBLICATIONS

"A New Document Image Skew Correction Method Based on Hough Transformation," Science & Technology Information, 2007, pp. 73-74.

* cited by examiner

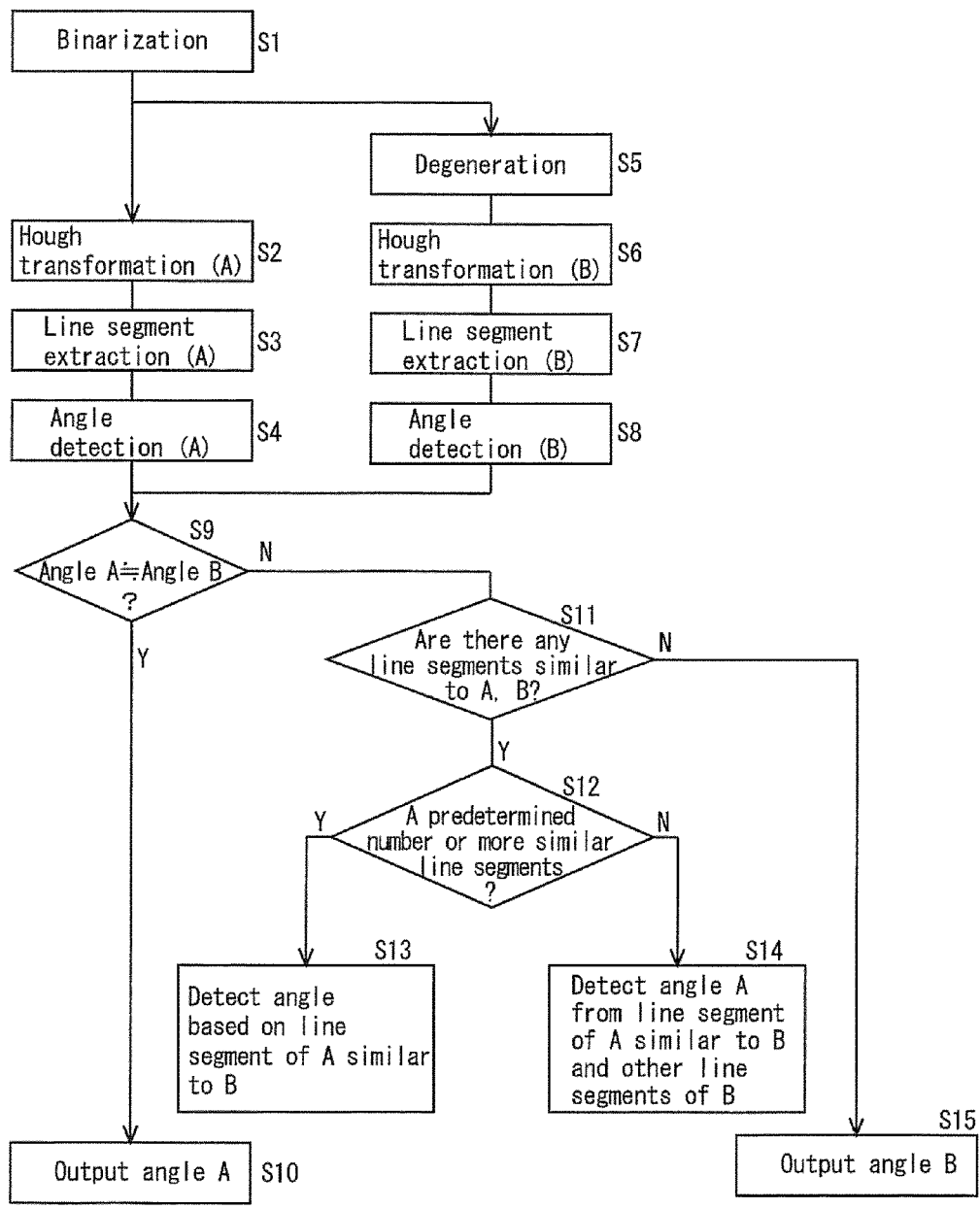
F I G. 4

F I G. 5
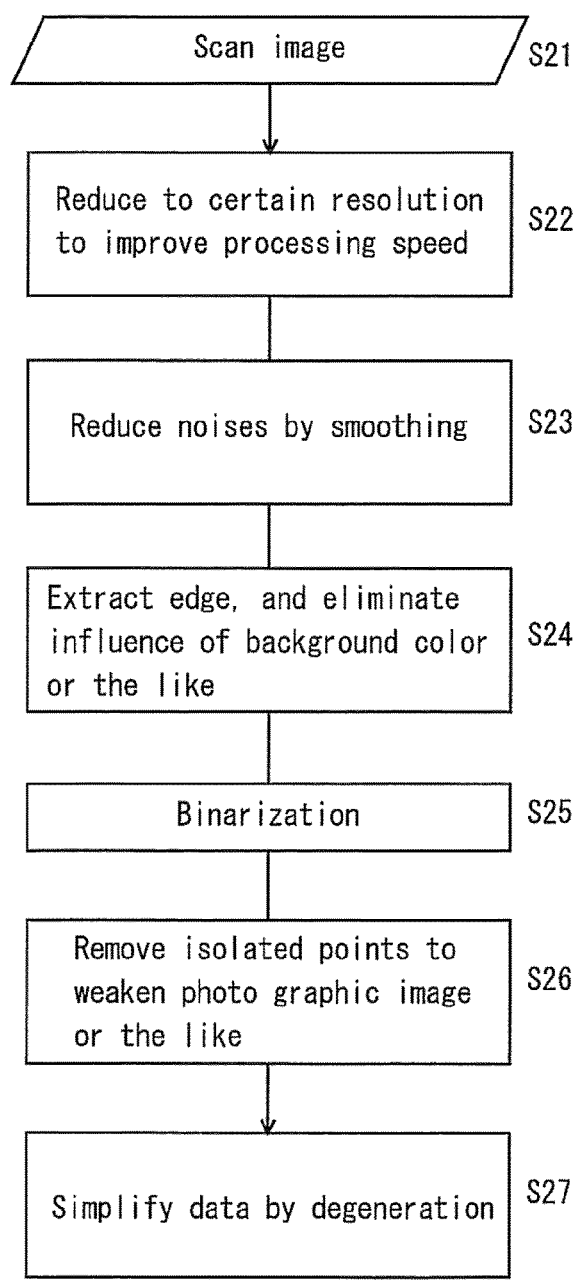

- Removal of graphic patterns (e.g., line segment)

- Since accuracy of detection based only on one point having the largest number of votes is low, detection is made based on a plurality of points.

Straight line based on the largest number of voltes

- If selection is simply made from points ranked high, adjacent points may be selected undesirably.

- The point of the next rank is selected after masking an area around the selected point.

Extraction angle

IMAGE PROCESSING APPARATUS, IMAGE PROCESSING METHOD, IMAGE PROCESSING PROGRAM, AND STORAGE MEDIUM

BACKGROUND OF THE INVENTION

1. Field of the Invention

The present invention relates to detection of tilt angles of an input image.

2. Description of the Related Art

Sometimes, when an image is read by a scanner, the image to be read is tilted slightly. In a conventional approach, in order to correct for tilt, for example, edges of a document or paper are detected. If the document or paper has a rectangular shape, the edges must be oriented parallel to a main scanning direction or an auxiliary scanning direction, and any deviation from these directions indicates a tilt of the document or paper. However, in this approach, tilt can be detected only when scanning, and tilt of stored images or images transferred from the outside cannot be detected. Further, since tilt of the document or paper is detected, when the paper is not a standard type of paper such as an excerpt, tilt cannot be detected. Further, in the case of scanning two facing pages of a hardcover book, even if the cover is not tilted, the two facing pages may be tilted. Also in this case, detection of tilt is difficult. In order to solve these problems, it is required to detect tilt of the image itself instead of detecting tilt of the document or paper.

In this regard, the related art will be described below. JPH10-283476A describes detection of straight lines in an image by Hough transformation. However, JPH10-283476A does not show detection of tilt of the image itself by Hough transformation. Further, according to experiments conducted by the inventor, in a vote table obtained by Hough transformation of an image, when straight lines having the largest number of votes were determined as straight lines in parallel to tilt of the image, tilt of the straight line having the largest number of votes was often different from tilt of the actual image substantially. For example, if there is a photograph, picture or a graphic pattern in the image, and the photograph, picture or graphic pattern includes slanted lines that tend to be extracted by Hough transformation, and angles of slanted lines which are different from tilt of the image itself tend to be detected.

SUMMARY OF THE INVENTION

Preferred embodiments of the present invention are provided to overcome the problems described above and to determine tilt angles of an image accurately based on the nature of the image itself.

Preferred embodiments of the present invention are also provided to determine tilt angles of an image without being affected by the influence of slanted lines or the like.

According to a preferred embodiment of the present invention, an image processing apparatus for determining tilt angles of an image includes a Hough transformation unit arranged to transforms coordinates of points in the image into a distance $\rho$ and an angle $\theta$, and cast votes to a vote table having the distance $\rho$ and the angle $\theta$ as headers to extract straight lines in the image; an extraction unit arranged to extract a predetermined number of points having numbers of votes ranked high from the vote table; and a tilt angle determination unit arranged to determine an extraction angle $\theta x$ to achieve maximum consistency with angles $\theta$ at the predetermined number of points, and determine the tilt angles of the image based on the determined extraction angle $\theta x$.

In a method of processing an image according to another preferred embodiment of the present invention, an information processing apparatus is used to perform the steps of applying Hough transformation to transform coordinates of points in the image into a distance $\rho$ and an angle $\theta$, and cast votes to a vote table having the distance $\rho$ and the angle $\theta$ as headers to extract straight lines in the image; extracting a predetermined number of points having numbers of votes ranked high from the vote table; and determining an extraction angle $\theta x$ to achieve maximum consistency with angles $\theta$ at the predetermined number of points, and determining the tilt angles of the image based on the determined extraction angle $\theta x$.

Further, yet another preferred embodiment of the present invention provides a non-transitory computer readable medium containing an image processing program that is executed by an information processing apparatus to cause the information processing apparatus to perform the steps of applying Hough transformation to transform coordinates of points in the image into a distance $\rho$ and an angle $\theta$, and cast votes to a vote table having the distance $\rho$ and the angle $\theta$ as headers; extracting a predetermined number of points having numbers of votes ranked high from the vote table; and determining an extraction angle $\theta x$ to achieve maximum consistency with angles $\theta$ at the predetermined number of points, and determining the tilt angles of the image based on the determined extraction angle $\theta x$.

In the present application, description regarding the image processing apparatus is directly applicable to the image processing method and the image processing program. Conversely, description regarding the image processing method is directly applicable to the image processing apparatus and the image processing program. The image as a target of processing is, e.g., an image immediately after being read by a scanner. Alternatively, an image received through a facsimile, file transfer, and an e-mail or other suitable method, media or device, or an image stored in a memory may be used as the target of processing. Further, the straight line and the line segment have the same meaning. For example, the image processing program is supplied from a non-transitory computer readable storage medium to the image processing apparatus, or supplied through a carrier wave to the image processing apparatus.

The meaning of the maximum consistency herein will be described. For each point, it is determined whether the point is within an allowable range from the extraction angle $\theta x$. If so, a value of 1 is assigned, and otherwise, a value of 0 is assigned. When the sum of these values is the maximum, the consistency is the maximum. Without assigning the value of 0 or 1, the value may be changed gradually depending on the difference from the extraction angle $\theta x$. Further, as the weight of the consistency, the number of votes obtained at each point may be used, and the total of the numbers of votes obtained at the respective points within the allowable range from the extraction angle $\theta x$ may be used as the consistency.

In Hough transformation, a line of characters in an image can be regarded as straight lines including disconnected portions. Therefore, in various preferred embodiments of the present invention, tilt angles in the image can be determined from, e.g., orientations of the line of characters, ruled lines, underlines or the like. Thus, the tilt angles can be determined based on the nature of the image itself.

In Hough transformation, coordinates (x, y) of a point in an image are represented as $\rho = x \cos \theta + y \sin \theta$, and transformed into a distance $\rho$ and an angle $\theta$. One point in the image is transformed into a plurality of points in ($\rho$, $\theta$) space. After transformation of each point, a vote is cast to the vote table having ρ and θ as headers. The points of ρ and θ having large numbers of votes represent a straight line in the image. However, according to the experience of the inventor, when tilt of the image was determined based on the point having the largest number of votes, the orientation of the detected tilt angles was often significantly different from the orientation of the line. Most of the detected tilted angles were, e.g., straight lines of graphic pattern portions or photo pictures, or slanted lines of handwritings included in the image. In contrast, when the extraction angle θx is determined to achieve maximum consistency with angles θ at a predetermined number of points having numbers of votes ranked high, and the tilt angles are determined based on the determined extraction angle θx, since the tilt angles can be determined from a plurality of significant straight lines in the image, detection was made successfully with improved reliability.

Preferably, the tilt angles of the image are determined based on an average of the angles θ at points within an allowable range from the extraction angle θx, among the predetermined number of points. In this manner, since the tilt angles can be determined based on the average of the data of points in the allowable range, detection can be made reliably.

Further, preferably, the tilt angles of the image are determined based on a weighted average of the angles θ at points within an allowable range from the angle θx in correspondence with a number of votes of each angle θ, among the predetermined number of points. For example, the weighted average in correspondence with a number of votes herein means weighted average using the number of votes as the weight, weighted average using the root or square root of the number of votes as the weight. In this manner, the tilt angles can be determined by suitably putting importance on points having large numbers of votes.

Preferably, the image processing apparatus is configured not to determine the tilt angles of the image if a proportion of a number of points where the angles θ are within an allowable range from the angle θx, among the predetermined number of points, to the predetermined number of points is less than a predetermined value. The fact that only a small number of points are present in an allowable range of angle from the extraction angle θx, among the predetermined number of points means that angles at the extracted points are distributed widely, and reliability is low. Therefore, in such a case, by stopping detection of the tilt angles, detection with low reliability can be avoided.

Preferably, the image processing apparatus is configured not to determine the tilt angles of the image if the predetermined number of points includes any point having a number of votes whose proportion to the largest number of votes among the predetermined number of points is less than an allowable range. In the case of detecting a line of characters or a ruled line as straight lines, there must be no significant difference between numbers of votes at the predetermined number of points. Nevertheless, if the predetermined number of points includes any point having a number of votes whose proportion to the largest number of votes among the predetermined number of points is less than an allowable range, it is probable that a long straight line in a graphic pattern portion or a photo picture portion in the image is detected. Therefore, in such a case, by stopping detection of the tilt angles, detection with low reliability can be avoided.

Preferably, the image processing apparatus is configured to mask an area around each of extracted points in the vote table at the time of extracting the predetermined number of points, to prevent other points in the masked area from being extracted from the vote table. In this manner, it becomes possible to extract straight lines from a wide area of the target image. Therefore, the chance of successfully extracting straight lines of the line of characters, ruled lines, underlines or the like is increased.

Preferably, degeneration for simplifying line segments into points is applied to the image by a degeneration unit, and Hough processing is applied to the image with degeneration. In the specification, the point is not limited to one pixel, and may include a plurality of pixels which have an appearance of a point. By degeneration, line segments are transformed into simple points. However, the line of characters is maintained. In this manner, the tilt angles can be determined based on the line of characters in the image. Further, since the number of valid pixels in the image is reduced by degeneration, Hough transformation can be performed at a higher speed.

Preferably, the Hough transformation unit, the extraction unit, and the tilt angle determination unit are configured to determine first tilt angles by Hough transformation of the image with degeneration, and determine second tilt angles by Hough transformation of the image without degeneration. Further, a comparator unit is provided to compare the first tilt angles with the second tilt angles. If a difference between the first tilt angles and the second tilt angles is within a predetermined range, the second tilt angles are determined as the tilt angles of the image, and if the difference between the first tilt angles and the second tilt angles are not within the predetermined range, the first tilt angles are determined as the tilt angles of the image.

The first tilt angles represent tilt angles obtained using only lines of characters, and the second tilt angles represent tilt angles obtained using tables, underlines, slanted lines or the like in addition to the line of characters. If the first tilt angles are similar to the second tilt angles, it can be presumed that there are contributions of line segments of tables or underlines, in parallel to or perpendicular to lines of characters. Even if both of the first tilt angles and the second tilt angles are determined based on lines of characters, since the second tilt angles are not affected by the change of the image that may be caused by degeneration, it can be considered that the accuracy of the second tilt angles are higher than the accuracy of the first tilt angles. In this manner, the tilt angles can be determined with a high degree of accuracy.

When the first tilt angles are significantly different from the second tilt angles, the first tilt angles are determined as the tilt angles of the image. In this manner, the tilt angles can be determined without being affected by the influence of slanted lines in the graphic pattern portion, the photo picture portion or the like in the image.

When the consistency between the first tilt angles and the second tilt angles is intermediate in degree, for example, a plurality of line segments as a first set are extracted from an image which is obtained by Hough transformation of the image with degeneration, and a plurality of line segments as a second set are extracted from an image which is obtained by Hough transformation of the image which has not been subject degeneration. Among the second set of line segments, line segments having orientation differences within a predetermined range in the first set of line segments, preferably, line segments having the orientation difference within a first predetermined range, and having distance differences in Hough transformation within a second predetermined range in the first set of line segments are extracted to determine the tilt angles. The number of such line segments may be one. However, the tilt angles should be determined based on a plurality of line segments for improved reliability. Therefore, when the number of extracted line segments is small, in order to improve the reliability, among the first set of line segments, line segments that do not have any correspondence with the second set of line segments are added to the extracted line segments. Based on tilt of these line segments, the tilt angles of the image are determined.

If the difference is not within the predetermined range, preferably, when there are no line segments having similar tilt, between a first group of line segments extracted by Hough transformation of the image with degeneration and a second group of line segments extracted by Hough transformation of the image without degeneration, the first tilt angles are determined as the tilt angles of the image. When there are any line segments having similar tilt, between the first group of line segments and the second group of line segments, the tilt angles of the image are determined at least based on tilt of the line segments of the second group of line segments that is similar to tilt of the line segments of the first group of line segments.

The extracting unit may extract the first group of line segments from the input image which has been subjected to degeneration, and extract the second group of line segments from the input image without degeneration without determining the first tilt angles and the second tilt angles. The tilt angle determination unit may determine the tilt angles of the input image at least based on tilt of the line segment of the second group of line segments that is similar to tilt of the line segment of the first group of line segments.

More preferably, in the second group of line segments, if there are a predetermined number or more of line segments having tilt similar to tilt of the first group of line segments, the tilt angle determination unit determines the tilt angles of the image based on the tilt of the predetermined number or more of line segments, and in the second group of line segments, if there are less than the predetermined number of line segments having tilt similar to tilt of the first group of line segments, the tilt angle determination unit determines the tilt angles of the image based on the tilt a group of line segments including the first group of line segments in addition to the line segments which is less than the predetermined number.

Preferably, a binarization unit is provided to binarize the image into valid pixels and invalid pixels, and a filter is used to replace valid pixels that are connected to each other in the binarized image with invalid pixels, from an end of the connected pixels. In this manner, degeneration can be performed simply.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram showing an algorithm of determining whether tilt angles should be determined based on tables and underlines or tilt angles should be determined using characters according to a preferred embodiment of the present invention.

FIG. 5 is a view showing a preprocessing algorithm according to a preferred embodiment of the present invention.

DETAILED DESCRIPTION OF THE PREFERRED EMBODIMENTS

Figure 1:
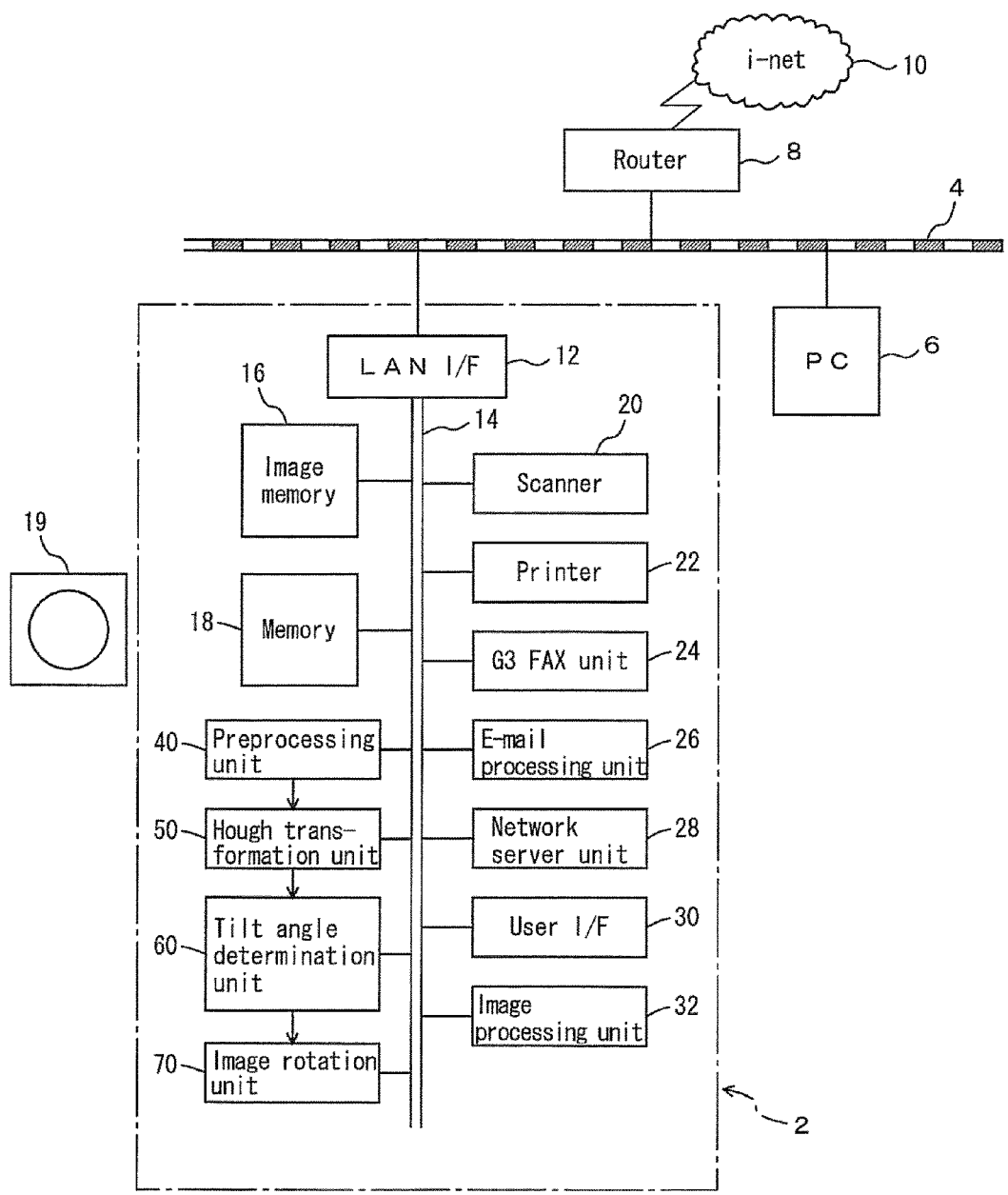
FIG. 1 is a block diagram showing a multifunction machine according to a preferred embodiment of the present invention.

Hereinafter, preferred embodiments of the present invention will be described. The scope, details, features and characteristics of the various preferred embodiments of the present invention can be changed in a manner that is evident to a person skilled in the art in consideration of techniques known in this technical field.

FIGS. 1 to 22 show preferred embodiments of a multifunction machine 2 taken as examples of the present invention. A reference numeral 4 denotes a LAN, and a reference numeral 6 denotes a personal computer. The personal computer 6 is an example of an information processing apparatus. A reference numeral 8 denotes a router for connection of the Internet 10 to the multifunction machine 2 and the personal computer 6. Detection and correction of the tilt angles in the present preferred embodiment are performed by the multifunction machine 2. Alternatively, detection and correction of the tilt angel in the present preferred embodiment may be performed by the personal computer 6. For example, an image read by a scanner 20 of the multifunction machine 2 may be transferred to the personal computer 6, and the tilt angles may be detected, and corrected by the personal computer 6.

A structure of the multifunction machine 2 will be described. A reference numeral 12 denotes a LAN interface, a reference numeral 14 denotes a bus, and a reference numeral 16 denotes an image memory as a page memory that stores image data. A memory 18 is a general purpose memory that stores programs, interim data or the like. A storage medium 19 such as a CD-ROM, for example, stores an image processing program in the present preferred embodiment, and the memory 18 stores the image processing program or the like provided from a disk drive (not shown) or the LAN interface 12 or the like. The scanner 20 reads an image from a document or paper in monochromatic gray scale or full colors, a printer 22 prints the image, and a G3 facsimile unit 24 carries out G3 facsimile transmission and reception of the image. An e-mail processing unit 26 carries out transmission and reception of images attached as files to e-mails, and a network server unit 28 operates the multifunction machine 2 to be used as a document management server, a remote printer or the like. A user interface 30 receives manual inputs from a user, and an image processing unit 32 carries out various types of image processing. A preprocessing unit 40, a Hough transformation unit 50, and a tilt angle determination unit 60 are provided to detect tilt angles of a scanned image, a received image, or a stored image. Further, an image rotation unit 70 rotates the image at an angle equal to the detected tilt angles counterclockwise to correct the tilt.

Figure 2:
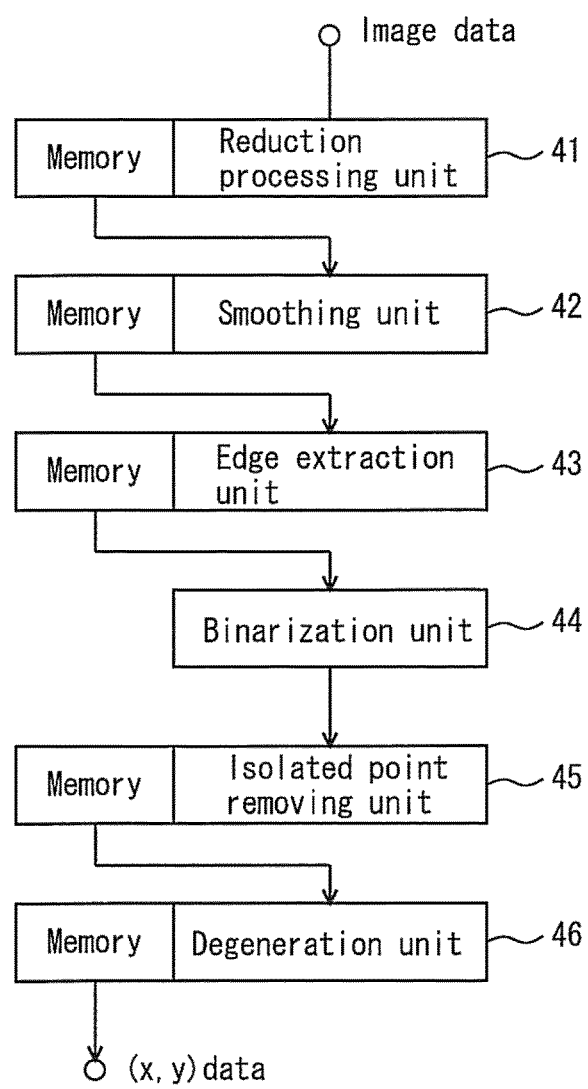
FIG. 2 is a bock diagram showing a preprocessing unit according to a preferred embodiment of the present invention.

FIG. 2 shows the structure of the preprocessing unit 40. Image data is inputted from the image memory 16 to a reduction processing unit 41, and resolution of the image is reduced to 1/n (n is a natural number equal to 2 or more, preferably, 4 to 8, particularly preferably, 4 to 6). Thus, the amount of data is reduced to $1/n^2$. For example, reduction of image data can be performed by determining an average value of pixel values of the image for each of n×n pixel blocks. Further, more simply, in the reduction processing unit 41, representative points in the n×n pixel blocks, e.g., data of one pixel at the upper left vertex of each block may be outputted directly. In this manner, Hough transformation can be performed $n^2$ times faster. Even if the same image data was used and the data content and the resolution did not change, when a different detection reduction rate was used in the reduction processing unit 41, sometimes, a different result of the tilt angles was obtained. Therefore, regardless of the resolution when scanning, by degrading the resolution up to a certain resolution using the reduction processing unit 41, the difference in the detection value of the tilt angles due to the difference in the resolution can be eliminated.

Even when the image is not scanned by the multifunction machine 2, as in the case of facsimile reception data or the like, if the resolution when scanning is known, in the same manner, the image is reduced to a certain resolution. Resolution when scanning can be detected from communication protocols, headers of image files or the like. If no resolution is described in the header, as in the case of a jpeg image, the image is reduced at a certain resolution rate such as ¼ or ⅛, for example.

A smoothing unit 42 removes noises from a reduced image using a smoothing filter or the like so as not to extract random data in the image as straight lines by Hough transformation. Next, an edge extraction unit 43 extracts edges or the like from the smoothed image using an edge extraction filter such as a Laplacian filter or a Sobel filter. The influence of background colors can be eliminated, and even in the case of outline characters, the edges corresponding to the outline of characters can be detected.

A binarization unit 44 binarizes the extracted edges. The threshold value of binarization may be a fixed value, or may be determined based on luminance of the extracted edges, distribution of color values or the like. Further, it is not required to binarize all of the edges. For example, when character portions, photo picture portions, and graphic pattern portions in the image can be identified, it is desirable to binarize only the character portions.

The image data handled in the present preferred embodiment preferably are monochromatic gray scale images. Alternatively, RGB images may be handled. In this case, the RGB data may be converted into luminance image to detect the tilt angles. Further, the tilt angles may be detected for each of R, G, B components, and the average value of the tilt angles may be used.

An isolated point removing unit 45 removes isolated points from the binarized image. Alternatively, the isolated point removing unit 45 may remove isolated points from the edge image before binarization. By removal of isolated points, the amount of data is reduced, and the probability of detecting the false tilt angles is decreased. The number of isolated points is particularly large in the case of a photo picture image. The isolated points are data that are not related to the tilt of the original image.

A degeneration unit 46 applies degeneration to the binarized image after removal of the isolated points. It should be noted that removal of the isolated points may be omitted. The degeneration herein is a process of removing valid pixels from the end of the coupling portion when valid pixels are continuously arranged in a vertical direction, in a left-right direction, and in an diagonal direction, i.e., when the valid pixels are connected in a vertical direction, in a horizontal direction, or in a diagonal direction. In the degeneration, when the valid pixels are connected to form line segments, the valid pixels are deleted from the end of the line segment, and the line segment is simplified into points made up of one pixel or two pixels, for example. The valid pixels are pixels having data in the binarized image regardless of whether the pixels are white or black pixels. By the degeneration, for example, the line segment is simplified to two pixels. If a circular pattern, a rectangular pattern, or a crisscross pattern is formed by coupling of valid pixels, the pattern can be simplified into two pixels, four pixels or the like. As a result, in effect, slanted lines in the graphic pattern portions and the photo picture portions disappear, and detection can be made without being affected by the influences of the graphic pattern portions and the photograph or picture portions. In degeneration, though the number of valid pixels in the characters is reduced, straight lines made up of lines of characters are not lost. Further, by the degeneration, the number of pixels as the target of Hough transformation is reduced to perform Hough transformation at high speed. When ruled lines and underlines are used for detection of the tilt angles, the degeneration unit 46 may not be provided. For example, when ruled lines are included in an image, one may wish to use the orientation of ruled lines for detection of tilt. In this case, degeneration is not required.

Figure 3:
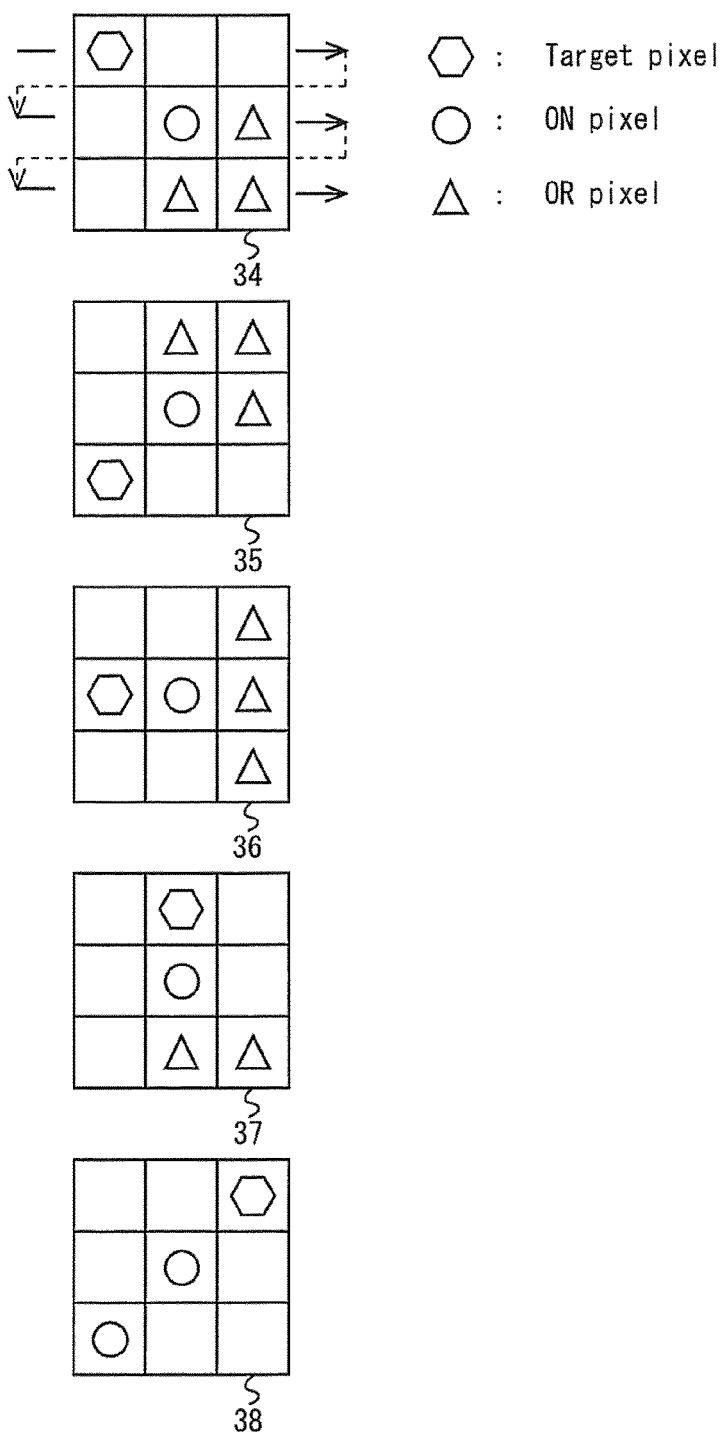
FIG. 3 is a diagram showing a filter used in degeneration according to a preferred embodiment of the present invention.

FIG. 3 shows filters 34 to 38 used for degeneration. The image as a target of processing has been already binarized. Pixels having hexagonal marks are target pixels. For each target pixel, it is considered whether replacement from a valid pixel to an invalid (non-valid pixel) should be made or not. If pixels having circular marks are valid pixels, and pixels having triangular marks include any valid pixels, the target pixel is replaced with an invalid pixel. In degeneration, after one line is processed along a main scanning direction, the line is shifted by one pixel in an auxiliary scanning direction for degeneration to the next line. In degeneration, for example, five filters 34 to 38 are used for parallel processing. Target pixels corresponding to any of filter patterns are replaced with invalid pixels. The order and the orientation of processing can be determined arbitrarily.

By using the filters 34 to 38, one pixel at an end of three valid pixels connected vertically, laterally, or diagonally is processed into an invalid pixel. In general, the filters used in degeneration at least process one pixel at one end of a plurality of valid pixels connected vertically, laterally, or diagonally, into an invalid pixel. In degeneration, one pixel from two connected valid pixels may be processed into an invalid pixel. Alternatively, one or more pixels at an end of four or more valid pixels connected in an arbitrary direction may be processed into invalid pixels regardless of whether the pixels are connected vertically, laterally, or diagonally.

It is easy to degenerate the binarized image. Alternatively, degeneration may be applied to an image before binarization, e.g., after smoothing or edge extraction. As an example, it is assumed that luminance p is used as a threshold value for binarization, and pixels having luminance of p or less are valid pixels.

The filters 34 to 38 should handle pixels of luminance p or less at the target pixel positions as target pixels. In the drawings, if pixels at positions of circles and triangles have luminance of p or less, such pixels should be handled as valid pixels. In this manner, processes of erosion and binarization can be handled altogether. With respect to reduction in the number of pixels, degeneration has the same effect as that of edge extraction. Degeneration may be applied to the image after smoothing. In this case, edge extraction can be omitted. Further, degeneration may be applied to the image before smoothing after reduction of image data. In an extreme case, degeneration is applied to the image before reduction of image data, and then, binarization and Hough transformation are applied. In this case, reduction, smoothing, edge extraction, and removal of isolated points are omitted.

By degeneration, tilt angles A determined from straight lines in the image and tilt angles B determined from lines of characters can be compared with each other. When the angle A is substantially the same as the angle B, the angle A indicates an orientation of a ruled line in parallel or perpendicular to the line of characters, an orientation of an underlined line, an orientation of the line of characters in the image. In contrast, the angle B indicates only the orientation of the line of characters in the image. When the angle A and the angle B are substantially the same, for example, when the angle A indicates the orientation of the table or the orientation of the underline, the angle A is significant in comparison with the angle B. An algorithm that is performed to compare the angle A and the angle B to determine tilt angles is shown in FIG. 4.

In step S1, an image is binarized, and in step S2, Hough transformation is performed. In step S3, a plurality of line segments in the image are extracted (e.g., 8 line segments or 16 line segments are extracted), and the extracted line segments are referred to as a set A of the line segments. In step S4, the tilt angles A of the image are determined. In the meanwhile, in step S5, degeneration is applied to the binarized image, and then, in step S6, Hough transformation is performed. In step S7, a plurality of line segments in the image are extracted (e.g., 8 line segments or 16 line segments are extracted), and the extracted line segments are referred to as a set B of the line segments. In step S8, the tilt angles B of the image are determined. In step S8, it is determined whether the angle A and the angle B are substantially the same or not. For example, it is determined whether the difference between the angle A and the angle B is within about ±1° or not, or more widely about ±3° or not, for example. If the angle A and the angle B are substantially the same, the angle A is regarded as the tilt angles of the image (step S10). If the angle A and the angle B are not substantially the same, in steps S11 and S12, it is determined whether a predetermined number or more, e.g., three or more, similar line segments are present between the image with degeneration and the image without degeneration. The similar line segments herein means line segments having a difference in θ within about 1°, and a difference in ρ within a predetermined value, e.g., within 10 pixels, for example.

Figure 8:
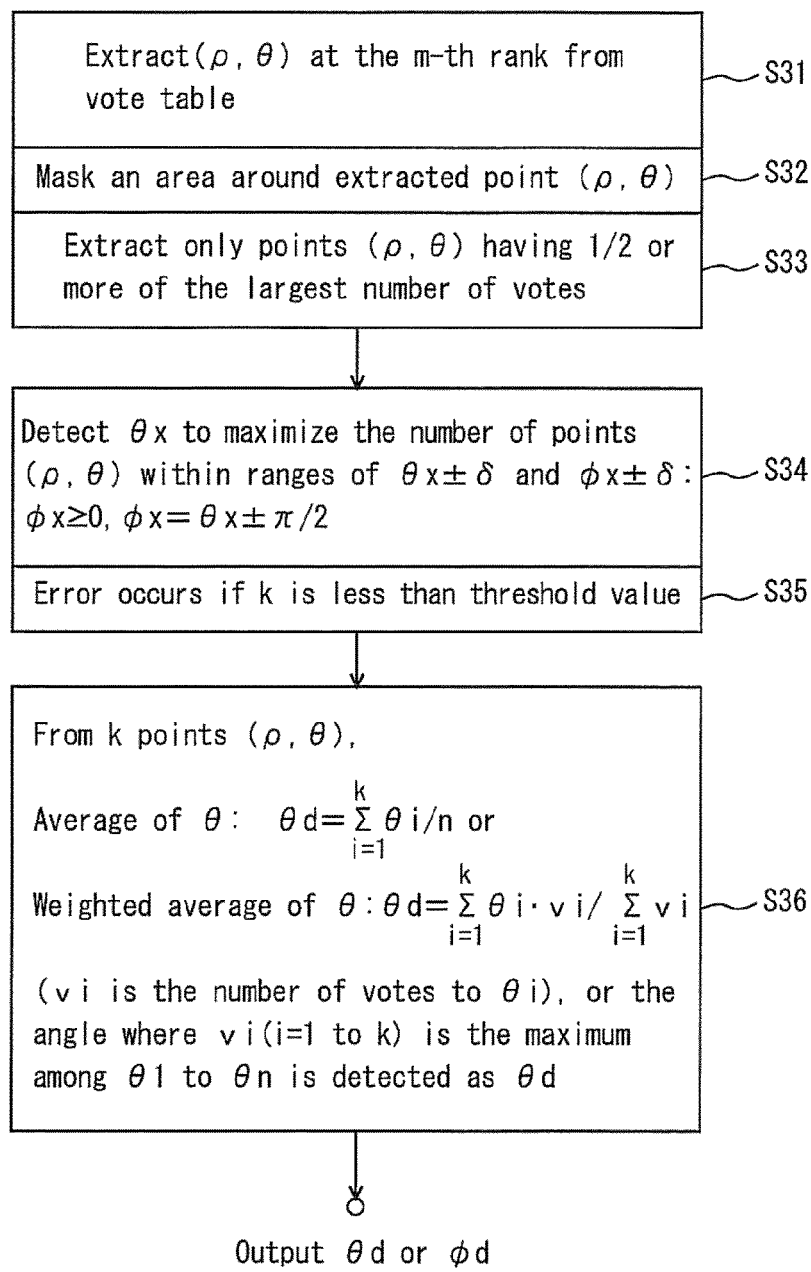
FIG. 8 is a diagram showing an algorithm of detecting tilt angles according to a preferred embodiment of the present invention.
Figure 9:
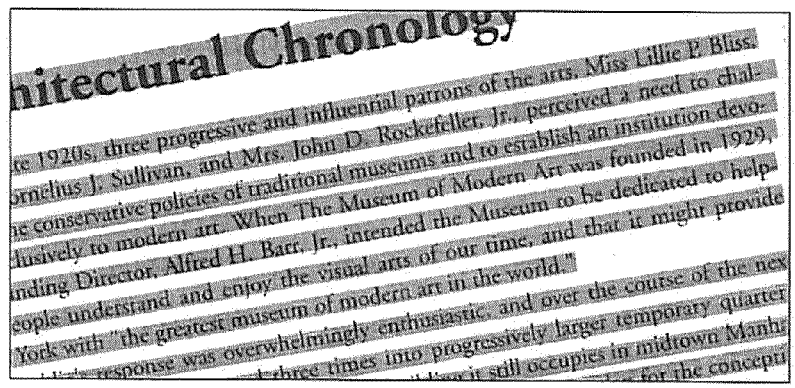
FIG. 9 is a view where lines of characters are regarded as straight lines according to a preferred embodiment of the present invention.
Figure 9:
Figure 9:
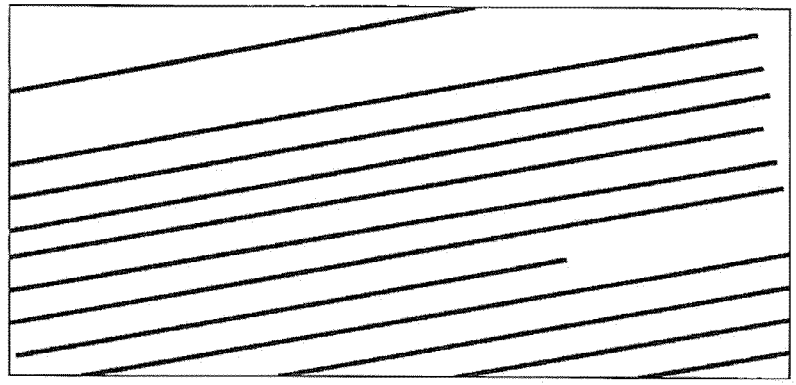

When there are a predetermined number or more of similar line segments, the tilt angles are determined based on the angle of the similar line segment of the image without degeneration (step S13). In step S13, preferably, the line segments in the image without degeneration are used, and the number of votes cast on each line segment is considered for the weight or the like to determine the angle. When there are similar line segments, but the number of the similar line segments is a predetermined number or less, the tilt angles are determined based on the angles of the similar line segments in the image without degeneration, and other segments in the image with degeneration (step S14). However, preferably, among the line segments in the image with degeneration, line segments that are similar to line segments in the image without degeneration should not be used to avoid the repeated use of similar data. Further, in step S14, for example, the product of the parameter which depends on whether the line segments belong to the image with degeneration or not and the number of votes of each line segment is used as the weight of each line segment. For example, the weight, e.g., in the range of 2 times to 4 times is added as a parameter to the line segments in the image without degeneration. If there are no similar line segments, the angle B is outputted as a result of extraction of slanted lines in the graphic pattern portion or the photograph or picture portion in the image without degeneration (step S15). FIG. 8 shows an algorithm of determining the angles A and B themselves. When line segments used to determine the angles are determined in steps S13 and S14, the algorithm shown in FIG. 4 is executed again. The line segment in FIG. 4 corresponds to points in (ρ, θ) space in FIG. 8.

In the present preferred embodiment, in accordance with the algorithm in FIG. 8, the tilt angles can be determined based on a plurality of line segments to improve reliability. However, the present invention is not limited in this respect. The tilt angles may be determined based on one line segment. In this case, if determination in step S11 is "Yes", the tilt angles are determined, e.g., based on one line segment on the angle A side (where no degeneration is applied). In this case, steps S12 and S14 are not required.

Step S11 may be carried out after steps S3 and S7 in FIG. 4 without determining the angles A and B. In this case, steps S4, S8, S9, S10, and S15 are omitted in FIG. 4. When no line segments similar to A and B are present in step S11, step S8 is carried out for the first time, and the angle B is outputted.

FIG. 5 shows an algorithm to perform controlling a pre-processing unit 40. In step S21, an image is read by the scanner 20. In step S22, the image is reduced to a certain resolution. Thus, the processing speed for Hough transformation is increased $n^2$ times. In step S23, noises are reduced by smoothing. In step S24, edges are extracted to remove the influence of the background colors, and to make it possible to detect outline characters. In step S25, binarization is performed, and in step S26, isolated points are removed. In this manner, influence of isolated points in the photograph or picture image or the like on detection of the tilt angles is reduced. Removal of the isolated points may be performed before binarization. In step S27, data is simplified by degeneration. Specifically, each of the straight lines in the photograph or picture portion and the graphic pattern portion is simplified, e.g., into two pixels. Step S27 may be performed before any of steps S22 to S26.

Steps S22 to step S27 as preprocessing steps are performed in synchronization with scanning of the image. Further, Hough transformation in the Hough transformation unit 50, detection of the tilt angles in the tilt angle determination unit 60, and correction of the tilt angles in the image rotation unit may be performed in synchronization with scanning. Synchronization herein means that the processing speeds of these processes are not less than the reading speed of the scanner 20. In this manner, tilt of the image can be corrected in real time, simultaneously with scanning of the image.

Figure 6:
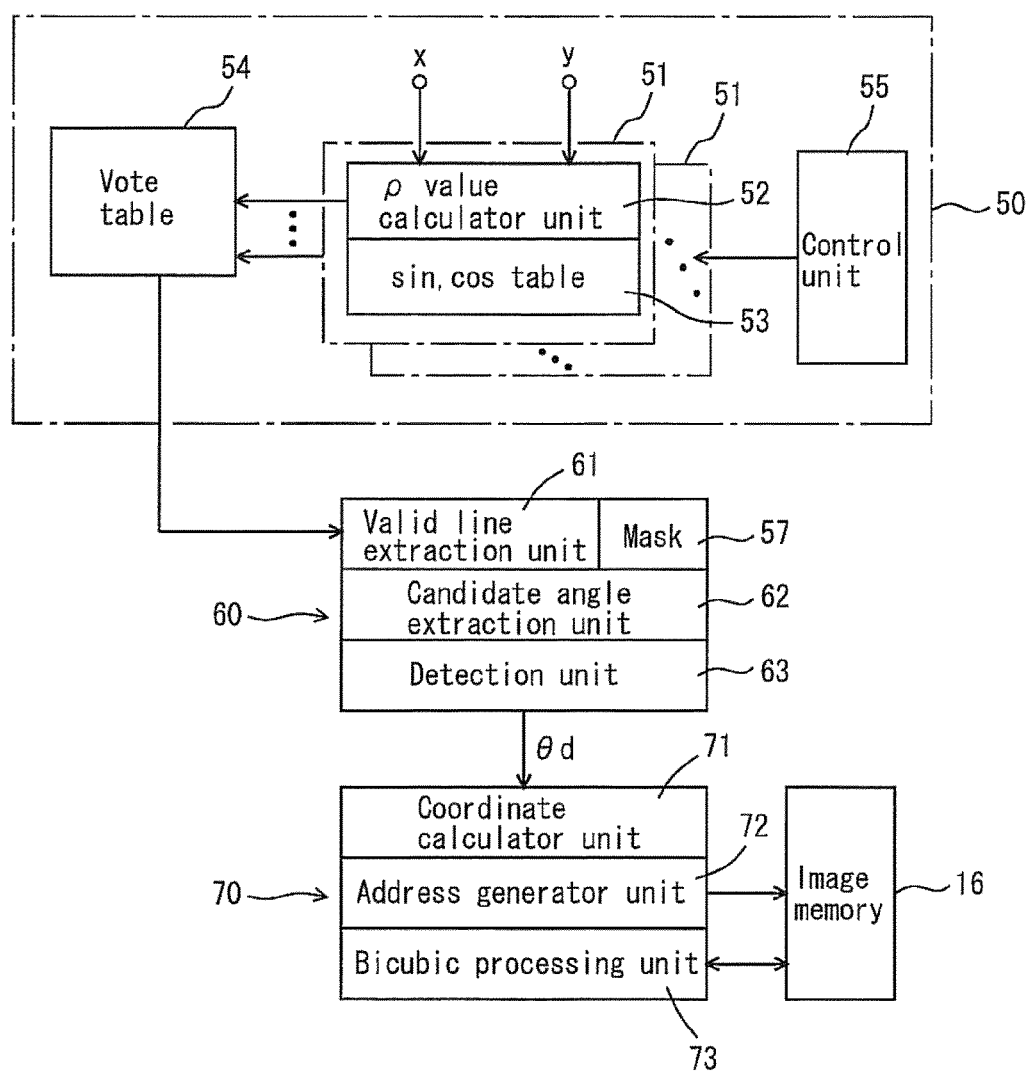
FIG. 6 is a block diagram showing components including Hough transformation unit and an image rotation unit according to a preferred embodiment of the present invention.

FIG. 6 shows a structure of components including the Hough transformation unit 50 and the image rotation unit 70. For example, the Hough transformation unit 50 preferably includes 16 to 32 execution units 51 to perform Hough transformation in parallel. Further, Hough transformation is applied to both of the image with degeneration and the image before degeneration. Each of the execution units 51 is made up of a $\rho$ value calculator unit 52 and a table 53 storing data of sin and cos. In order to cover the angle in the range of 0° to 180° using 32 tables 53, one table 53 stores data of angles, e.g., in the range of 5.625° (180/32), and stores the data by the units of, e.g., 0.176° (180°/1024). The $\rho$ value calculator unit 52 retrieves values of sin $\theta$ and cos $\theta$ from the table 53, and calculates the $\rho$ value at the position (x, y) of the valid pixel outputted from the degeneration unit 46 and the isolated point removing unit 45 as $\rho = x \cos \theta + y \sin \theta$. The vote table 54 is a two-dimensional table of $\theta$ and $\rho$. A control unit 55 controls a plurality of the execution units 51.

Figure 7:
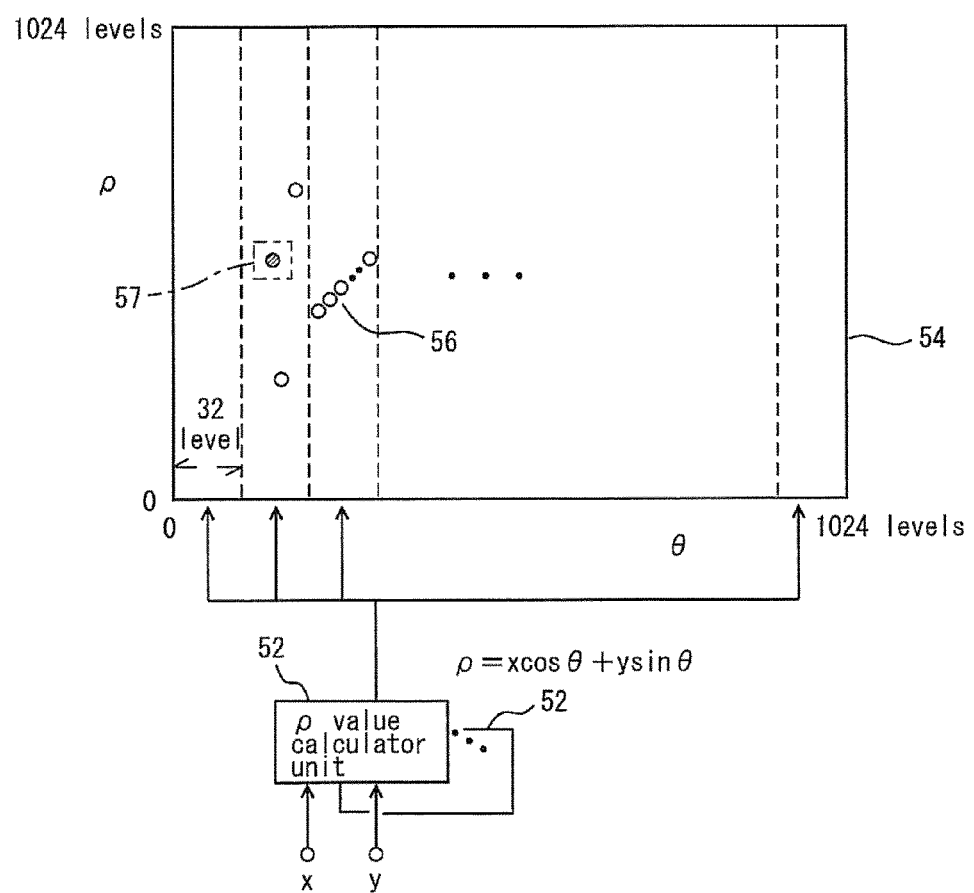
FIG. 7 is a view schematically showing a vote table according to a preferred embodiment of the present invention.

FIG. 7 shows the relationship between the $\rho$ value calculator unit 52 and the vote table 54. Each point in the table 54 denotes a combination of $\rho$ and $\theta$, and this combination indicates line segments. It is assumed that $\rho$ and $\theta$ are divided into 1024 levels. When values of x and y are inputted, the p value is calculated for each $\theta$, and data at the corresponding position in the table is incremented by 1. For example, the angle $\theta$ in the range of 180° is divided into 256 to 4096 levels, preferably, 1024 to 2048 levels for making it possible to detect the tilt angles with the accuracy of about 0.05° to 0.3°, preferably, about 0.1° to 0.2°. Further, the resolution of $\rho$ may be lower than the resolution of $\theta$. For example, there are preferably 32 execution units 51. Each of the $\rho$ value calculator units 52 handles $\theta$ of 32 levels (1024/32). As a result, as shown by circles in the third column from the left, values of ($\rho$, $\theta$) are voted. A reference numeral 57 denotes a mask used to mask an area around a point extracted as a valid line (extracted straight line) from the table 54 to allow the next valid line to be extracted from the outside of the mask 57.

Referring back to FIG. 6, for example, a valid line extraction unit 61 extracts "m" points ranked high, from the vote table 54. It is probable that the points having large numbers of votes in the vote table 54 denote valid lines in the image. Masking is applied to an area around each of the extracted points to prevent other points in the mask 57 from being extracted. A candidate angle extraction unit 62 extracts candidates (k candidates, e.g., m/2 or more candidates) of the tilt angles from the extracted valid line. A determination unit 63 determines tilt angles $\theta$d based on these candidate angles. The determined tilt angles $\theta$d are inputted to a coordinate calculator unit 71, and coordinates (addresses) after tilt correction are calculated for each of the pixels of the image stored in the image memory 16. An address generator 72 generates an address to read the image memory 16 based on the coordinates before tilt correction. A bicubic processing unit 73 interpolates the retrieved data, and writes the data after interpolation back to the image memory 16 based on the coordinates after tilt correction. As a result of these processes, the image in the image memory 16 is rotated to correct to the tilt. Simple affine transformation may be used for rotation.

FIG. 8 shows an algorithm in the tilt angle determination unit 60. Highly ranked points ($\rho$, $\theta$) up to m-th rank, e.g., up to 16th rank or 8th rank are extracted from the vote table (step S31). Masking is applied to an adjacent area around each of the extracted points, e.g., an adjacent area having a square shape with each side having the size of 5 to 40 levels (step S32) to prevent two or more points from being extracted from the same adjacent area. Only points ($\rho$, $\theta$) having numbers of votes equal to or more than the ½ of the largest number of votes are extracted. Therefore, if the number of votes at the point of the m-th rank is less than the ½ of the largest number of votes, it is considered that an error has occurred. Thus, the tilt angles are not detected, and the image rotation unit 70 does not rotate the image (step S33). Steps S32 and S33 are auxiliary processes for carrying out step S31. In this manner, m points that are not present in the adjacent area of any of other points, with the number of votes of the ½ or more of the largest number of votes are extracted. The "½ or more" mentioned herein is merely an example. The range of "⅔ or more", "0.4 or more" or other suitable ranges may be adopted. Steps S31 to S33 correspond to processes of the valid line extraction unit 61.

Next, an angle for determining candidate tilt angles is determined as $\theta$x, and an angle perpendicular to the angle $\theta$x is determined as $\phi$x. The angle $\theta$x has a positive value or 0, and $\phi x = \theta x + \pi/2$ or $\phi x = \theta x - \pi/2$. $\delta$ is determined as an allowable range. For example, $\delta$ is 1°, 0.5° or other suitable values. $\theta$x is determined to maximize the number of points ($\rho$, $\theta$) within the ranges of $\theta x \pm \delta$ and $\theta x \pm \delta$. Then, the points within the ranges of $\theta x \pm \delta$ and $\phi x \pm \delta$ are outputted (step S34). Stated otherwise, with respect to "m" points, the angle which achieves the maximum number of matching points having angle $\theta$ components within the range of $\pm \delta$ is determined as $\theta$x. Simply, instead of considering the number of matching points having $\theta$ components within the range of $\pm \delta$, the sum of the numbers of votes at points within the range of $\theta x \pm \delta$ and the numbers of votes at points within the range of $\phi x \pm \delta$ may be maximized. When the number of these points k is less than a threshold value, for example, when the number of these points k is less than m/2 or m/3, it is considered that an error has occurred in step S35. In this case, the image rotation unit 70 does not rotate the image without detecting the tilt angles. Steps S34 and S35 correspond to the processes of the candidate angle extraction unit 62.

Step S36 corresponds to the determination unit 63. With respect to k points ($\rho$, $\theta$) determined in step S34, for example, the simple average value of angle $\theta$ is outputted as the tilt angles $\theta$d. Alternatively, the weighted average of angles $\theta$ at k points may be used. The number of votes vi may be used as the weight. Further, alternatively, among k candidates $\theta$1 to $\theta$k of $\theta$, an angle $\theta$ having the largest number of votes vi may be used as the tilt angles $\theta$d. In step S36, $\theta$d is outputted. When $\theta$d exceeds $\pi/2$, $\theta d - \pi/2$, i.e., $\phi$d is outputted.

FIGS. 9 to 22 show operation of a preferred embodiment of the present invention. A document image is shown on the upper side in FIG. 9. The lines of characters in the image are regarded as straight lines, and tilt of the straight lines is detected. Therefore, the present preferred embodiment transforms an image on the upper side of FIG. 9 into an image on the lower side of FIG. 9, and applies Hough transformation to the image on the lower side.

Figure 10:
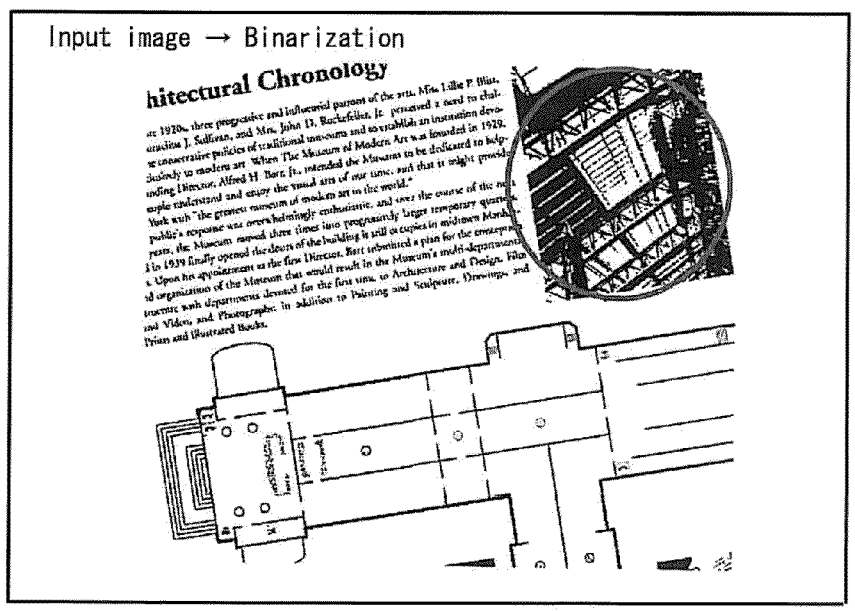
FIG. 10 is a view where an input image is binarized directly.
Figure 11:
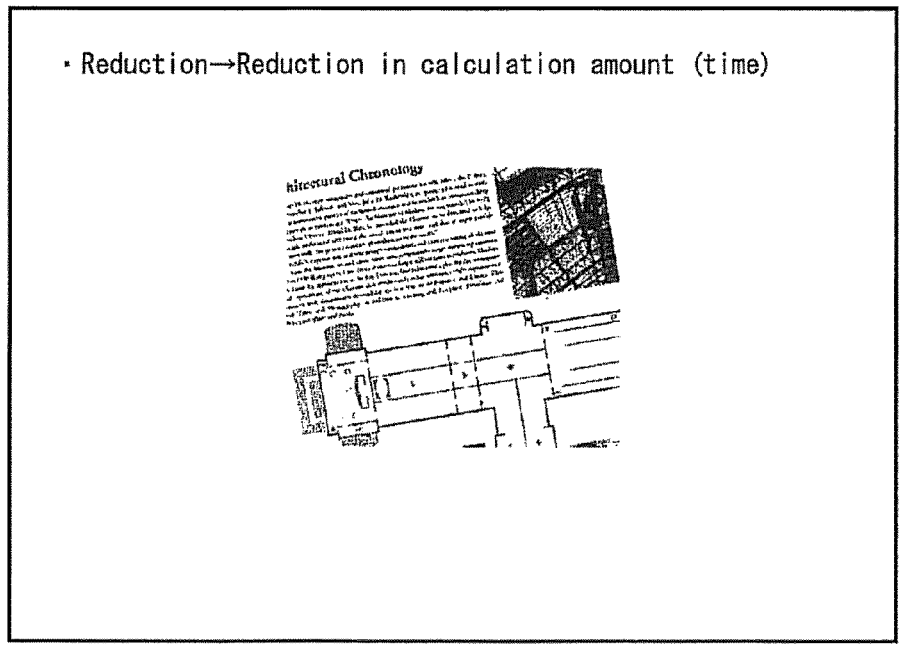
FIG. 11 is a view showing a reduced image of an input image according to a preferred embodiment of the present invention.
Figure 12:
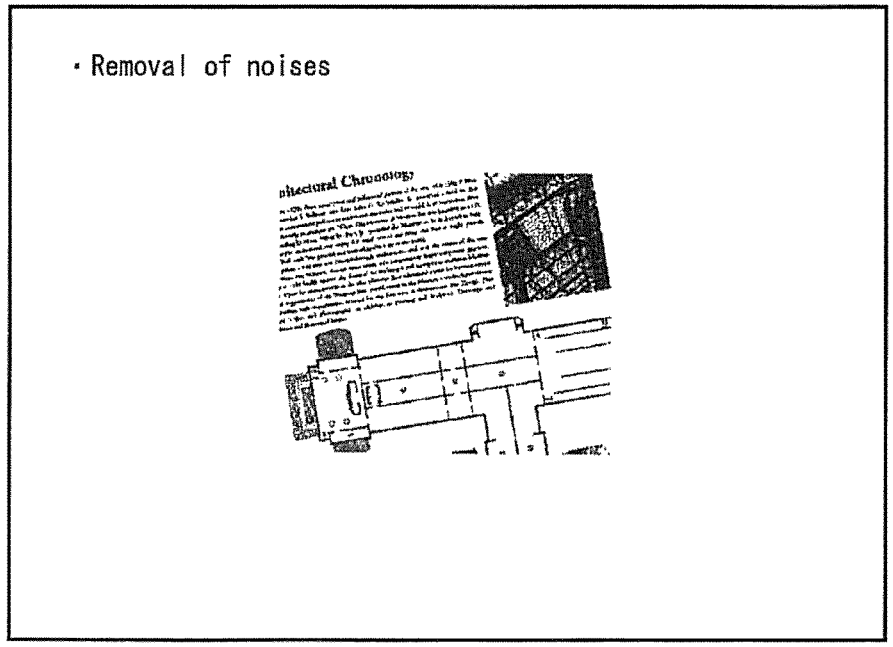
FIG. 12 is a view showing an image after noises are removed from the reduced image according to a preferred embodiment of the present invention.

FIG. 10 shows an example where binarization of the input image (image of the image memory 16) is performed without any reduction, smoothing, or edge extraction. As marked by a circle, a large number of black pixels (valid pixels in this case) are present in a photograph or picture portion which does not include any characters, and burden on the Hough transformation is increased. Further, since the influence of slanted lines or the like in the photo picture portion is strong, the detection accuracy is low. Therefore, the input image is handled by gray scale, and binarization is performed after image processing such as reduction, smoothing, and edge extraction. In order to perform Hough transformation at high speed, the input image is reduced to 1/n. Thus, the subsequent calculation time is reduced to $1/n^2$ (FIG. 11).

Figure 13:
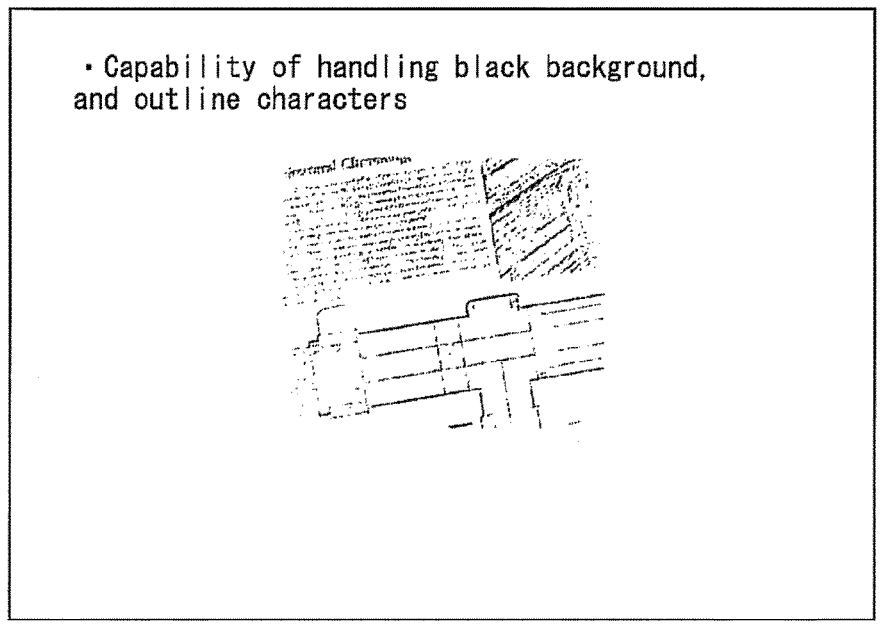
FIG. 13 is a view showing edges extracted from the image after noise removal according to a preferred embodiment of the present invention.

Then, noises are removed by smoothing (FIG. 12), and edges are extracted to obtain an image as shown in FIG. 13. By Edge extraction, influence of the background colors is eliminated, and outline characters can be handled. Further, the data is simplified to facilitate Hough transformation.

Figure 14:
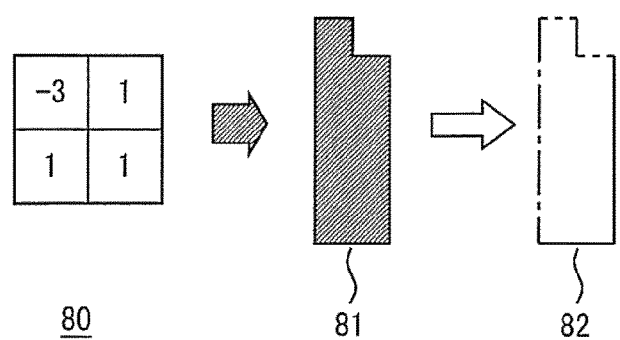
FIG. 14 is a view showing an edge extraction filter according to a preferred embodiment of the present invention.
Figure 15:
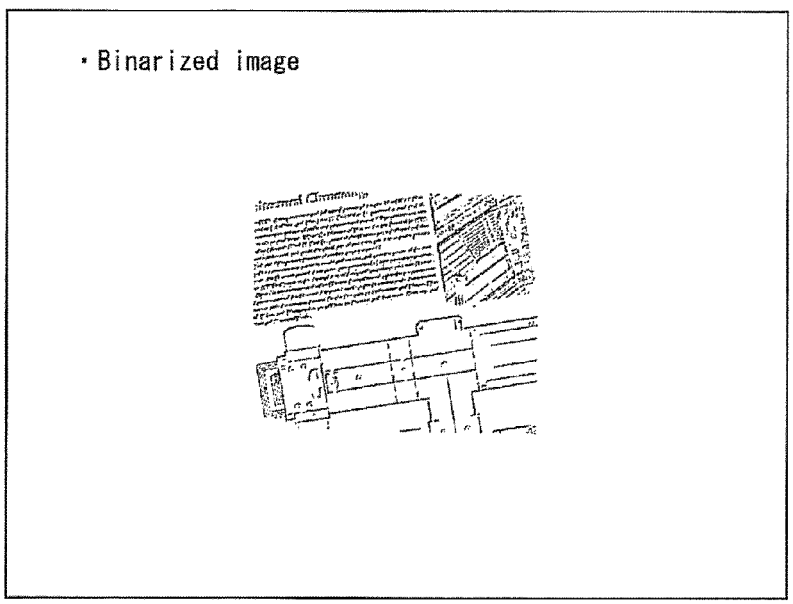
FIG. 15 is a view showing a binarized image obtained by binarizing edges of the image according to a preferred embodiment of the present invention.
Figure 16:
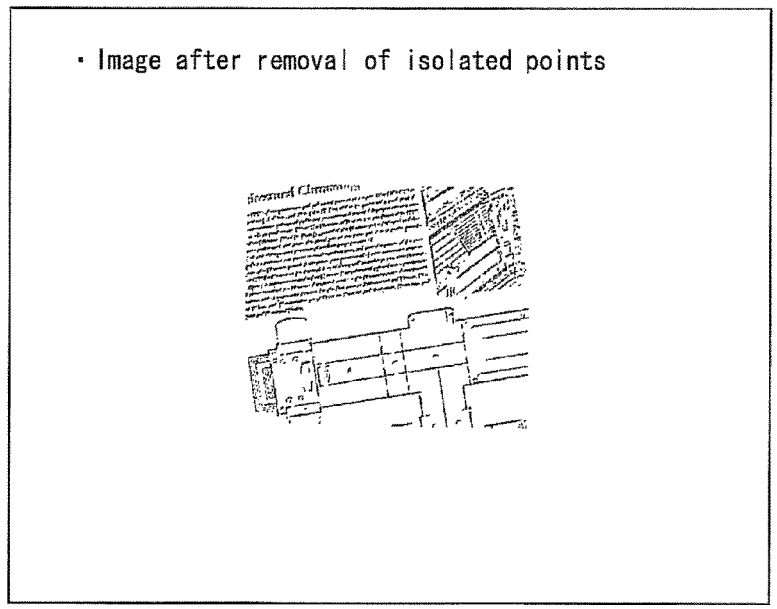
FIG. 16 is a view showing an image after removal of isolated points from the binarized image according to a preferred embodiment of the present invention.

FIG. 14 shows an edge extraction filter 80. By applying the filter 80 to a target image 81 from the upper left side, edges 82 on the lower side and on the right side are extracted. Thus, in comparison with the case where all the edges of the target image 81 are detected, the quantity of the edges can be reduced to ½. As described above, among four types of edges, i.e., upper, lower, left, and right edges, two types of edges, i.e., lower and right edges, lower and left edges, upper and right edges, or upper and left are extracted. By binarizing the image after edge extraction, an image as shown in FIG. 15 is obtained. By removing isolated points from the image of FIG. 15, an image of FIG. 16 is obtained. The isolated points may be removed from the edge image of FIG. 13.

Figures 17, 18:
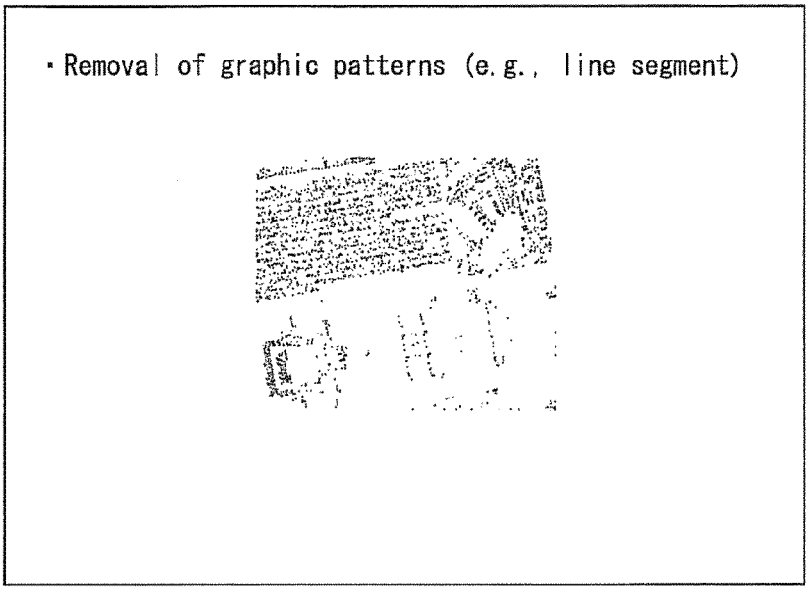
FIG. 17 is a view showing an image obtained by degeneration after removal of the isolated points according to a preferred embodiment of the present invention.
FIG. 18 is a view showing a false line based on the largest number of votes.

As shown in FIGS. 15 and 16, if lines of graphic pattern portion or the photo picture portion remain in the image, the tilt angles may be detected erroneously. Therefore, by performing degeneration, an image shown in FIG. 17 is obtained. Lines in the photo picture and the graphic pattern are converted into isolated points, and lines of character strings are saved. Thus, by applying Hough transformation to the image with degeneration, only straight lines made up of lines of characters can be detected. As shown in step S10 in FIG. 4, when the lines and orientations of the characters are aligned in the table, or in the underlines, it is preferable to detect the tilt angles using the table or the underlines. Therefore, in practice, it is preferable to apply Hough transformation to both of the image with degeneration and the image before degeneration.

By applying Hough transformation, data is stored in the vote table. If only a point having the largest number of votes is extracted simply, erroneous detection may occur. FIG. 18 shows an example of such a case. Since FIG. 18 shows the image partially, it is difficult to recognize from which portion of the image the "straight line based on the largest number of votes" is extracted. However, it should be noted that the "straight line based on the largest number of votes" is extracted from the photo picture portion or the like in the image. Even if the example is not an extreme case like FIG. 18, the largest number of votes may be cast on a solid line in the graphic pattern or a slanted line in the photo picture portion. The lateral lines in the graphic portion on lower side in FIG. 15 are in parallel to tilt of the image. However, this is a coincidence. A plurality of points having numbers of votes ranked high are extracted so as not to extract straight lines that do not correspond to inherent tilt of the corresponding image as noted above. In the case of simply extracting points having numbers of votes up to the m-th rank, a plurality of adjacent points in the vote table tend to be extracted. In this regard, the point at the position of the highest rank is extracted from the vote table 54, and an area around each of the extracted points is masked, and the point at the position of the second highest rank is extracted. In the same manner, points around this point are extracted. Thus, the points having numbers of votes up to the m-th rank are extracted. Among the extracted points having numbers of votes up to the m-th rank, if the point at the lowest rank does not have, e.g., the ½ of the number of votes at the point of the highest rank, it is regarded that an error has occurred in detection. In the case of extracting lines made up of characters, there must be no big difference in the number of votes between the point having the largest number of votes at the highest rank and the point at the m-th rank. However, if a large difference is present, it is probable that the point having the largest number of votes at the highest rank is straight lines portion or the like in the graphic pattern. Otherwise, among the points ranked high up to the m-th rank (e.g., 16-th rank), points having a certain proportion or more (e.g., ½ or more) of the votes to the largest number of votes at the point of the highest rank are extracted. When the number of extracted points has a predetermined value k (e.g., 4) or less, it may be considered that an error has occurred. That is, the tilt angles have not been detected.

Figures 19, 20:
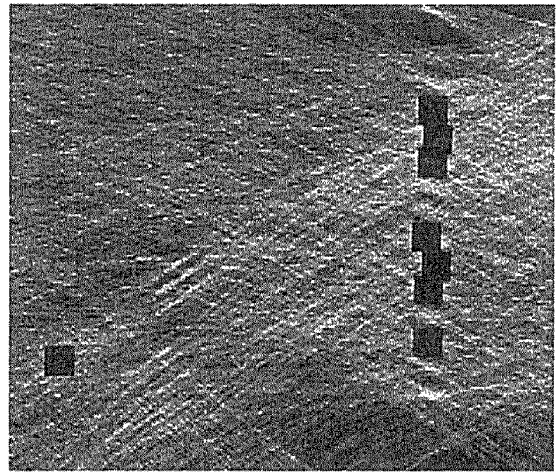
FIG. 19 is a view showing a state where a plurality of adjacent points in a vote table is selected as valid lines.
FIG. 20 is a view showing a state of extracting a valid line after areas around extracted lines are masked in the preferred embodiment, wherein luminance shows the number of votes in the vote table.

FIG. 20 schematically shows a condition of a vote table. In FIG. 20, the number of votes is indicated by luminance. Areas around the selected points are covered using black rectangular masks. In FIG. 20, points having numbers of votes ranked high, up to the 8-th rank have been extracted.

Figure 21:
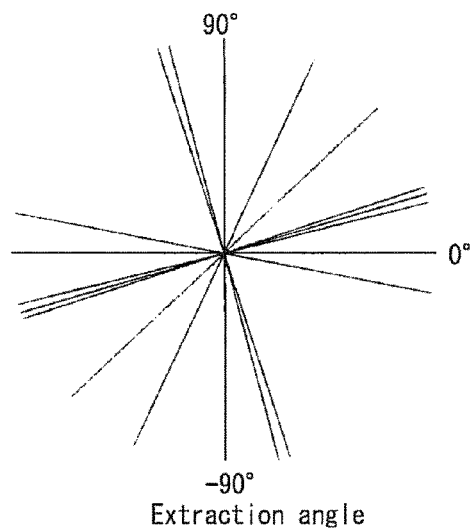
FIG. 21 is a view schematically showing valid lines extracted according to a preferred embodiment of the present invention.
Figure 22:
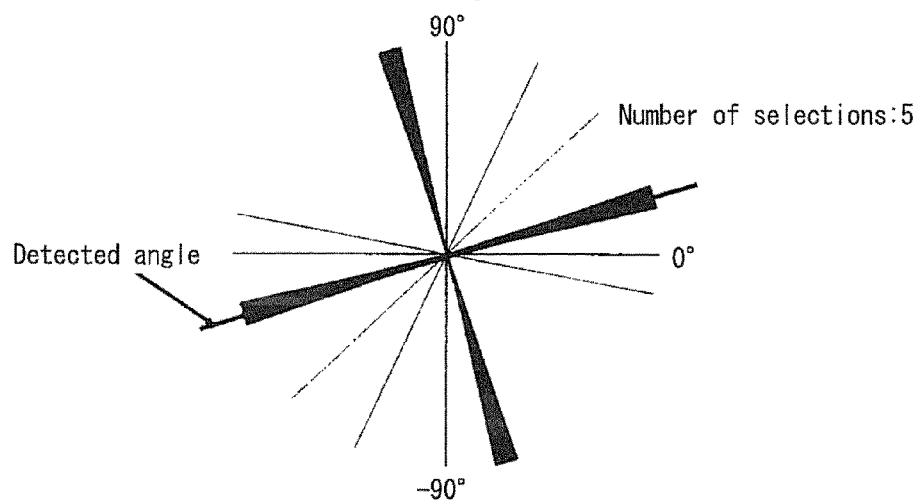
FIG. 22 is a view schematically showing a method of determining tilt angles according to a preferred embodiment of the present invention.

The tilt angles are determined for the extracted points up to the m-th rank. This process is schematically shown in FIGS. 21 and 22. In the case of detecting a line of characters, since character strings below and above the character blocks can be detected, the tilt angles θd and the angle φd perpendicular to the angle θd have significance. Further, the allowable error when extracting candidates is determined as δ (about 0.5° or about 1°, for example), and θx is determined to maximize the number of points k in the ranges of θx±δ and φx±δ. If the value of k is less than the threshold value (e.g., m/2), it is considered that an error has occurred. When the angle θx including points in the number of the threshold value or more is obtained, the candidate angle is determined based on the simple average or weighted average of the angles of the included points. This is the process of step S36 in FIG. 8.

In this manner, the tilt angles θd are determined with the accuracy of about ±0.1°, for example, and the image is rotated by an image rotation unit 70 to correct tilt. Rotation of the image itself can be carried out simply. For example, the image can be rotated in synchronization with scanning.

Figure 23:
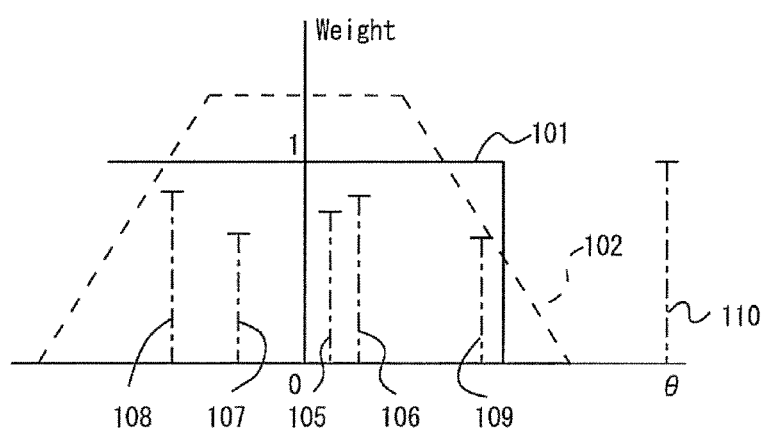
FIG. 23 is a diagram schematically showing a function of evaluating consistency when extracting candidates of the tilt angles according to a preferred embodiment of the present invention.

FIG. 23 shows evaluation functions 101, 102 used to evaluate consistency. The lateral axis denotes deviation from the extraction angle θx, and the vertical axis shows weights of the evaluation functions 101, 102.

Further, reference numerals 105 to 110 denote extracted data using angles. The heights of data 105 to 110 denote numbers of votes. In the present preferred embodiment, the evaluation function 101 having the weight of 0/1 is used. Alternatively, like the evaluation function 102, the weight may be decreased in correspondence with the deviation from θx. In any of the evaluation functions 101, 102, the number of votes may be reflected to evaluate consistency, e.g., like the sum included in the evaluation function of (weights of data 105 to 110×the numbers of votes of respective data).

In the process of FIG. 8, the tilt angles θd are determined preferably based on the simple average or weighted average of the angles θ, preferably based on the data 105 to 109 as targets, using the weight of 1 which has passed the evaluation function 101. However, instead of directly using the numbers of votes in the weight average, the square root or the square of the numbers of votes may be used. The weighted average which reflects the number of votes may be used to increase the weight as the increase in the number of votes.

In the present preferred embodiment, θx is determined beforehand, and then, data 101 to 105 or the like are extracted. Thereafter, the angle θd is determined using data 105 to 109. Thus, the data 105 to 109 can be reflected sufficiently in determination of the angle θd. More simply, the angle θx itself may be used as the tilt angles θd. However, when the angle θx itself is used as the tilt angles θd, since the angle θx is determined to include the data 109 at the end position, the tilt angles θd tend to be affected by the influence of the data 109 at the end position. Therefore, as in the case of the present preferred embodiment, it is preferable to include the two steps of determining the angle θx and determining the tilt angles θd.

In the present preferred embodiment, rotation and correction of the tilt angles are performed inside the multifunction machine 2. Alternatively rotation and correction of the tilt angles may be performed by the personal computer 6 or the like. In this case, when the image processing program according to a preferred embodiment is performed by an information processing apparatus such as a personal computer, the information processing apparatus is regarded as the image processing apparatus according to a preferred embodiment of the present invention.

When tilt of the two facing pages of a book is detected, for example, when information to the effect that the type of the document includes two facing pages is inputted, tilt angles of the right page and the left page can be detected separately. Otherwise, the input image may be divided into the left side and the right side to determine the tilt angles of each side, and if the left tilt angles and the right tilt angles are different, it can be presumed that this is an image of two facing pages.

In various preferred embodiments of the present invention, the following advantages are obtained.

In Hough transformation, when tilt of the image is determined based on the point having the largest number of votes, the orientation of the detected tilt angles may be significantly different from the orientation of the line. However, when the extraction angle θx is determined to achieve the maximum consistency with angles θ at the predetermined number of points having a number of votes ranked high, and the tilt angles are determined based on the determined extraction angle θx, detection can be performed reliably and accurately.

When the tilt angles of the image are determined based on an average of the angles θ at points within an allowable range from the extraction angle θx, among the predetermined number of points, detection can be made with greater reliability.

When the tilt angles of the image are determined based on a weighted average of the angles θ at points within an allowable range from the angle θx in correspondence with a number of votes of each angle θ, among the predetermined number of points, the tilt angles can be determined by suitably putting importance on points having large numbers of votes.

When only a small number of points are present within an allowable range of angle from the extraction angle θx, by stopping detection of the tilt angles, detection with low reliability can be avoided.

When the predetermined number of points includes any point having a number of votes whose proportion to the largest number of votes among the predetermined number of points is less than an allowable range, it is probable that a long straight line in a graphic pattern portion or a photo picture portion in the image is detected. Therefore, in such a case, by stopping detection of the tilt angles, detection with low reliability can be avoided.

When an area around each of extracted points in the vote table is masked, it becomes possible to extract straight lines from a wide area of the target image. Therefore, the chance of successfully extracting straight lines of the line of characters, ruled lines, underlines or the like is increased.

By applying degeneration, line segments are transformed into simple points. However, the line of characters is maintained, and the tilt angles can be determined based on the line of characters in the image. Further, since the number of valid pixels in the image is reduced by degeneration, Hough transformation can be performed at the higher speed.

When degeneration is applied, first tilt angles based on lines of characters are obtained. When no degeneration is applied, second tilt angles mainly based on tables, underlines, slanted lines or the like are obtained. If the first tilt angles are similar to the second tilt angles, using the second tilt angles based on tables, underlines, slanted lines or the like, the tilt angles can be determined with a high degree of accuracy.

When the first tilt angles are significantly different from the second tilt angles, by using the first tilt angles, the tilt angles can be determined without being affected by the influence of slanted lines.

When the consistency between the first tilt angles and the second tilt angles is in an intermediate degree, for example, a plurality of line segments as a first set are extracted from an image which is obtained by applying Hough transformation to the image with degeneration. Further, a plurality of line segments as a second set is extracted from an image which is obtained by applying Hough transformation to the image which has not been subject degeneration. Among the second set of line segments, line segments having orientation differences within a predetermined range in the first set of line segments are extracted to determine the tilt angles. In this manner, even if the consistency is in the intermediate degree, the tilt angles can be determined.

When the image is binarized into valid pixels and invalid pixels, and the valid pixels that are connected to each other in the binarized image are replaced with invalid pixels, from the end of the connected pixels using a filter, degeneration can be performed simply.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

DESCRIPTION OF REFERENCE NUMERALS

2: multifunction machine
4: LAN
6: personal computer
8: router
10: Internet
12: LAN interface
14: bus
16: image memory
18: memory
19: storage medium
20: scanner
22: printer 24: G3 facsimile unit
26: e-mail processing unit
28: network server unit
30: user interface
32: image processing unit
34 to 38: filter
40: preprocessing unit
41: reduction processing unit
42: smoothing unit
43: edge extraction unit
44: binarization unit
45: isolated point removing unit
46: degeneration unit
50: Hough transformation unit
51: execution unit
52: ρ value calculator unit
53: table
54: vote table
55: control unit
56: data
57: mask
60: tilt angle determination unit
61: valid line extraction unit
62: candidate angle extraction unit
63: determination unit
70: image rotation unit
71: coordinate calculator unit
72: address generator unit
73: bicubic processing unit
80: filter
81: target image
82: edge
101, 102: evaluation function
105 to 110: data

What is claimed is:

1. An image processing apparatus for determining tilt angles of an image, the image processing apparatus comprising:
a Hough transformation unit that transforms coordinates of points in the image into a distance ρ and an angle θ, and casts votes to a vote table including the distance ρ and the angle θ as headers to extract straight lines in the image;
an extraction unit that extracts a predetermined number of points having numbers of votes ranked high from the vote table; and
a tilt angle determination unit that determines an extraction angle θx to achieve maximum consistency with angles θ at the predetermined number of points, and determines the tilt angles of the image based on the determined extraction angle θx; wherein
the extraction unit masks an area around each of extracted points in the vote table at a time of extracting the predetermined number of points having the numbers of votes ranked high, to prevent other points in a masked area from being extracted from the vote table.

2. The image processing apparatus according to claim 1, wherein the tilt angle determination unit determines the tilt angles of the image based on an average of the angles θ within an allowable range from the extraction angle θx, at points among the predetermined number of points.

3. The image processing apparatus according to claim 1, wherein the tilt angle determination unit determines the tilt angles of the image based on a weighted average of the angles θ within an allowable range from the extraction angle θx in correspondence with a number of votes of each angle θ, at points among the predetermined number of points.

4. The image processing apparatus according to claim 1, wherein the tilt angle determination unit does not determine the tilt angles of the image if a proportion of a number of points where the angles θ are within an allowable range from the extraction angle θx, among the predetermined number of points, to the predetermined number of points is less than a predetermined value.

5. The image processing apparatus according to claim 1, wherein the tilt angle determination unit does not determine the tilt angles of the image if the predetermined number of points includes any point having a number of votes whose proportion to the largest number of votes among the predetermined number of points is less than an allowable range.

6. The image processing apparatus according to claim 1, further comprising a degeneration unit that simplifies line segments in the image into points, and processing of the image by the Hough transformation unit is performed after processing of the image by the degeneration unit.

7. The image processing apparatus according to claim 6, wherein the Hough transformation unit, the extraction unit, and the tilt angle determination unit determine first tilt angles by applying Hough transformation to the image with degeneration, and determine second tilt angles by applying Hough transformation to the image without degeneration;
the image processing apparatus further comprising a comparator unit that compares the first tilt angles with the second tilt angles;
if a difference between the first tilt angles and the second tilt angles is within a predetermined range, the tilt angle determination unit determines the second tilt angles as the tilt of the image, and if the difference between the first tilt angles and the second tilt angles is not within the predetermined range, the tilt angle determination unit determines the first tilt angles as the tilt angles.

8. The image processing apparatus according to claim 7, wherein if the difference is not within the predetermined range, when there are no line segments having similar tilt, between a first group of line segments extracted by Hough transformation from an input image which has been subjected to degeneration and a second group of line segments extracted by Hough transformation from an input image without degeneration, the tilt angle determination unit determines the first tilt angles as the tilt angles of the input image, and when there are any line segments having similar tilt, between the first group of line segments and the second group of line segments, the tilt angle determination unit determines the tilt angles of the input image at least based on tilt of the line segments of the second group of line segments that is similar to tilt of the line segments of the first group of line segments.

9. The image processing apparatus according to claim 6, wherein the extraction unit extracts a first group of line segments from an input image which has been subjected to degeneration, and extracts a second group of line segments from an input image without degeneration; and
the tilt angle determination unit determines the tilt angles of the input image at least based on tilt of line segments of the second group of line segments that is similar to tilt of line segments of the first group of line segments.

10. The image processing apparatus according to claim 9, wherein in the second group of line segments, if there are a predetermined number or more of line segments having tilt similar to tilt of the first group of line segments, the tilt angle determination unit determines the tilt angles of the input image based on the tilt of the predetermined number or more of line segments, and in the second group of line segments, if there are less than the predetermined number of line segments having tilt similar to tilt of the first group of line segments, the tilt angle determination unit determines the tilt angles of the input image based on tilt of a group of line segments including the first group of line segments in addition to the line segments which is less than the predetermined number.

11. The image processing apparatus according to claim 6, further comprising a binarization unit that binarizes the input image into valid pixels and invalid pixels, and further comprising a filter that replaces valid pixels that are connected to each other in the binarized image with invalid pixels, from an end of the connected pixels.

12. The image processing apparatus according to claim 1, wherein the consistency evaluated at least based on points where the angle θ is included within an allowable range from the extraction angle θx.

13. The image processing apparatus according to claim 12, wherein the consistency is evaluated based on a number of points included in the allowable range, a sum of values assigned to get smaller in correspondence with errors between the extraction angle θx and the angles θ at points included in the allowable range, or a sum of number of votes at the points included in the allowable range.

14. The image processing apparatus according to claim 13, wherein the tilt angles of the image are determined based on points where the angles θ are included within the allowable range, among the plurality of points having the predetermined number of votes ranked.

15. The image processing apparatus according to claim 13, wherein the tilt angle determination unit determines the tilt angles of the image based on the average of the angles θ at points within an allowable range from the extraction angle θx, or a weighted average of the angles θ within the allowable range from the extraction angle θx in correspondence with a number of votes of each angle θ, among the predetermined number of points.

16. The image processing apparatus according to claim 1, wherein the mask comprises a rectangular mask including a plurality of levels of distances ρ and a plurality of levels of angles θ.

17. The image processing apparatus according to claim 1, wherein the image processing apparatus comprising a scanner that reads the image from a document or paper.

18. An image processing method of determining tilt angles in an image using an information processing apparatus, the information processing apparatus performing the steps of:

applying Hough transformation to transform coordinates of points in the image into a distance ρ and an angle θ, and casting votes to a vote table including the distance ρ and the angle θ as headers to extract straight lines in the image;

extracting a predetermined number of points having numbers of votes ranked high from the vote table while masking an area around each of extracted points in the vote table at a time of extracting the predetermined number of points having the numbers of votes ranked high, to prevent other points in the masked area from being extracted from the vote table; and determining an extraction angle θx to achieve maximum consistency with angles θ at the predetermined number of points, and determining the tilt angles of the image based on the determined extraction angle θx.

19. The image processing method according to claim 18, further comprising the step of degenerating the image for simplifying line segments into points to apply Hough transformation to the image that has been degenerated.

20. A non-transitory computer readable medium containing an image processing program that causes an information processing apparatus to perform the steps of:

transforming coordinates of points in the image into a distance ρ and an angle θ, and casting votes to a vote table having the distance ρ and the angle θ as headers;

extracting a predetermined number of points having numbers of votes ranked high from the vote table while masking an area around each of extracted points in the vote table at the time extracting the predetermined number of points having the numbers of votes ranked high, for preventing other points in the masked area from being extracted from the vote table; and determining an extraction angle θx to achieve maximum consistency with angles θ at the predetermined number of points, and determining the tilt angles of the image based on the determined extraction angle θx.

21. The image processing program according to claim 20, further comprising the steps of degenerating the image to simplify line segments into points to apply Hough transformation to the image with degeneration.

* * * * *